United States Patent
Wyatt, Jr. et al.

(10) Patent No.: US 10,527,749 B2
(45) Date of Patent: Jan. 7, 2020

(54) METHODS AND APPROACHES FOR GEOMECHANICAL STRATIGRAPHIC SYSTEMS

(71) Applicant: Halliburton Energy Services, Inc., Houston, TX (US)

(72) Inventors: Douglas E. Wyatt, Jr., Kingwood, TX (US); Jeffrey Marc Yarus, Houston, TX (US); Ronald Glen Dusterhoft, Katy, TX (US); Jesse Clay Hampton, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 276 days.

(21) Appl. No.: 15/370,702

(22) Filed: Dec. 6, 2016

(65) Prior Publication Data
US 2018/0156937 A1    Jun. 7, 2018

(51) Int. Cl.
*G01V 5/12*    (2006.01)
(52) U.S. Cl.
CPC .................... *G01V 5/12* (2013.01)
(58) Field of Classification Search
CPC ............. G01V 5/12; G01V 1/28; G01V 11/00
USPC ............................ 702/8, 11–14, 16
See application file for complete search history.

(56) References Cited

U.S. PATENT DOCUMENTS

| | | | | |
|---|---|---|---|---|
| 9,829,591 | B1* | 11/2017 | Yu | G01V 1/301 |
| 2011/0166843 | A1* | 7/2011 | Hsu | G01V 11/00 |
| | | | | 703/10 |
| 2011/0218737 | A1* | 9/2011 | Gulati | G01V 1/28 |
| | | | | 702/16 |
| 2014/0067353 | A1* | 3/2014 | Shelley | G06N 3/0427 |
| | | | | 703/10 |
| 2014/0336940 | A1* | 11/2014 | Bettinelli | G01V 1/282 |
| | | | | 702/14 |
| 2017/0108617 | A1* | 4/2017 | Fei | G01V 99/005 |
| 2017/0316128 | A1* | 11/2017 | Huang | G01V 99/005 |
| 2018/0196157 | A1* | 7/2018 | Zeroug | G01V 1/46 |

OTHER PUBLICATIONS

Boggs, S., 2006, Principles of Sedimentology and Stratigraphy, 4th ed.; Pearson Prentice Hall, Upper Saddle River, NJ; 662 p., downloadable at https://raregeologybooks.files.wordpress.com/2015/03/principles-of-sedimentology-and-stratigraphy-by-sam-jr-boggs.pdf.
Cant, D. J., 1991, Geometric modelling of facies migration: theoretical development of fades successions and local unconformities, Basin Research, vol. 3, No. 2, Jun. 1991, pp. 51-62.

(Continued)

*Primary Examiner* — Eman A Alkafawi
(74) *Attorney, Agent, or Firm* — John W. Wustenberg; Baker Botts L.L.P.

(57) ABSTRACT

A method for mapping a subterranean formation is disclosed. The method includes receiving a first set of subterranean formation data based, at least in part, on survey data from the subterranean formation. The method includes receiving a second set of subterranean formation data based, at least in part, on one or more formation samples from the subterranean formation The method includes determining a stratagraphic composition of the subterranean formation and generating a fortistratisgraphic map of the subterranean formation based, at least in part on the first set of subterranean formation data, the second set of subterranean formation data, and the stratigraphic composition of the subterranean formation.

20 Claims, 11 Drawing Sheets

(56) References Cited

OTHER PUBLICATIONS

Dyman, T.S., and Condon, S.M., 2006, Assessment of undiscovered conventional oil and gas resources—Upper Jurassic—Lower Cretaceous Cotton Valley Group, Jurassic Smackover Interior Salt Basins Total Petroleum System, in the East Texas Basin and Louisiana-Mississippi Salt Basins Provinces: U.S. Geological Survey Digital Data Series DDS-69—E, Chapter 2,48 p.
Gilreath, J. A., 1987, Schlumberger Technical Review, Jul. 1987, in Crain's Petrophysical Handbook, 13 pages.
Mann, J.C., 1993. Uncertainty in geology. Computers in Geology—25 Years of Progress. Oxford University Press, pp. 241-254.
Murphy, M. A. and A. Salvador, 2012, International Stratigraphic Guide—An abridged version, Episodes, vol. 22, No. 4,18 p.
Nichols, G., 2009, Sedimentology and stratigraphy, 2nd ed; John Wiley and Sons, West Sussex, UK; 419 p.
Wellman, J. F., F. Horowitz, E. Schill and K Regenauer-Lieb, 2010, Towards incorporating uncertainty of structural data in 3D geological inversion, Tectonophysics (2010), doi:10.1016/j.tecto.2010.04.022.
Zoback, M. D., 2007, Reservoir Geomechanics, Cambridge University Press, 449 p.
Slatt, Roger M. and Younane Abousleiman, 2011, Merging sequence stratigraphy and geomechanics for unconventional gas shales, TLE, Mar. 2011, p. 274-282.
Dusterhoft, Ron, "Enabling Cross Discipline Collaboration and Forward Modeling Through Advanced Subsurface Geocellular Earth Modeling" presented at the Gussow Geosciences Conference, Banff, Canada, Sep. 22-24, 2014, 9 p.

* cited by examiner

⇧ 5300(mg)(g)     ✶ Calche
➡ 53(mg)(g)     ◆ Dolomite
⬇ 5400(mg)(g)     + Feldper
▼ 54002(mg)(g)     × Quartz
⬅ PC(%)     ◌ Kadinite
▫ PI     ⬟ Pyrite
◇ Tpi52(*c)     ○ Lite
⊕ PC(%)     ● MixedLeper
⊗ TCC(%)     ✲ Smecite
△ H     ✳ Haline
⬆ OCO     ☆ Chlorite
☾ O     ★ Albine
☾ coMNC(%)     ✧ Toral Clay
⌒ MMC(%)     ■ Grain Density (g)(cc)
⌣ Titan(%)     ✹ Back Density (g)(cc)
☽ RCCO(%)     ✺ MeanPOR(%)
☾ Calculated RO(%)     ▲ Mean PERM(nD)
● Comprehensive Strength     ✵ 51(mg)(g)
○ Young's Modules     ⇨ 52(mg)(g)
⌢ Passel's roCo     ⇩ 53(mg)(g)
✧ Average Tensile Strength     ⇦ 5300(mg)(g)
▽ BHM
⌣ GRAP

Legend

FIG. 6C

METHODS AND APPROACHES FOR GEOMECHANICAL STRATIGRAPHIC SYSTEMS

BACKGROUND

The present disclosure relates generally to methods, workflow, processes, and approaches to utilize laboratory-based and wireline-log-based geomechanical and rock property information to establish geomechanically based stratigraphic system. Embodiment of the present disclosure may be used to establish a predictive method to map geomechanical properties within geologic strata in the subsurface.

Hydrocarbons, such as oil and gas, are produced from subterranean reservoir formations that may be located onshore or offshore. The processes involved in recovering hydrocarbons from a reservoir are becoming increasingly complex. Subterranean production is a highly expensive and extensive endeavor and the industry generally relies heavily upon educated predictions of reservoir conditions to characterize the reservoir prior to making substantial investments to optimize well placement within the reservoir, optimize production of hydrocarbons, and performing the necessary steps to produce, process and transport the hydrocarbons from the reservoir.

Geomechanical properties of a subterranean formation may provide useful information for the drilling, completion, and production of a well in the subterranean formation. The determination of reservoir geomechanical properties is typically determined on a well-by-well basis. There is a need for a system that allows for the prediction of geomechanical properties of a subterranean formation away from the wellbore based on a predictive modeling system that uses both sample-based and log-based data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6C shows the legend for the graph shown in FIGS. 6A and 6B;

Figure 1:
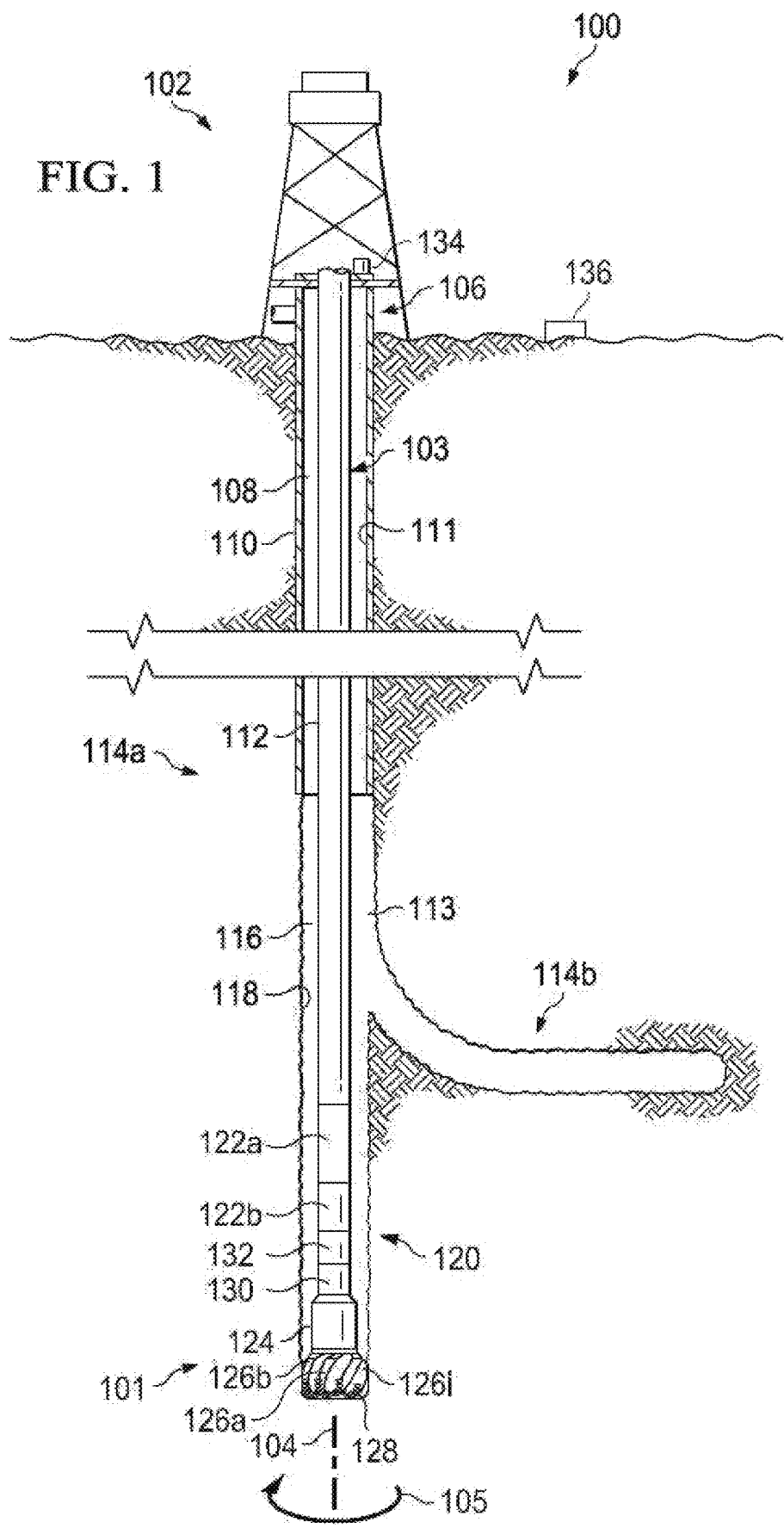
FIG. 1 is an illustrative wellsite system of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present application is directed to mapping geomechanical properties of a subterranean formation. Embodiments of the present disclosure use laboratory-based analysis of the subterranean formation in conjunction with log-based analysis to provide a geomechanically-based stratigraphic system, which may be referred to as a fortistratigraphic map. In certain example embodiments, the fortistratigraphic map is used in conjunction with other stratigraphic systems. The data to generate the fortistratigraphic map of the subterranean formation may include data from the current reservoir operation and data from previous similar reservoir operation that may be stored remotely. For example, embodiments of the present disclosure may use data from other wells or outcropping studies. With the present disclosure, automation may be used to collect, view, process, correlate, and store the data associated with a fortistratigraphic map of the subterranean formation. In particular, software functions in accordance with the present disclosure can automate or optimize the process of fortistratigraphic mapping.

These software functionalities of the present disclosure may be introduced into existing control software for reservoir operations, thereby automating and optimizing the process and efficiencies for a drilling operation to improve the reservoir operation.

With reference to the attached figures, certain embodiments of the present disclosure include a system 100 that may include a wellsite 104 and a wellsite database server 102A that couples together information handling systems (IHS) 106A, 108A, and 112A that may collect, process, store, correlate, and display various wellsite data and real time operating parameters. The IHS 106A, 108A, and 112A for example, may receive wellsite data from various sensors at the wellsite, including downhole and surface sensors. Additional IHS may also be present (not picture) and the present disclosure is not intended to limit the number of IHS at a wellsite.

Figure 2:
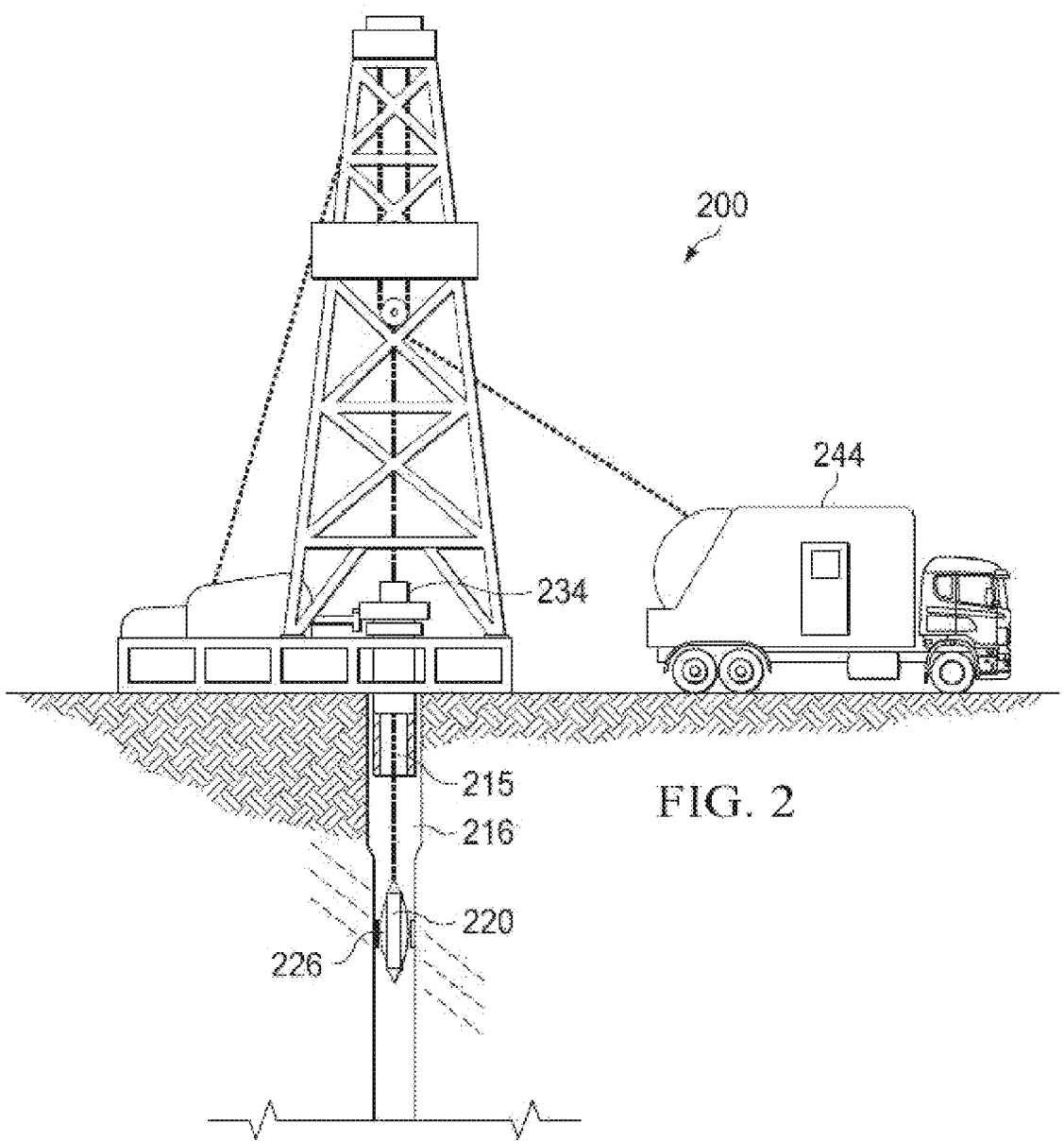
FIG. 2 shows another illustrative wellsite system of the present disclosure.

FIG. 2 of the present disclosure includes a further description of the system 100 including a wellsite database server 210 that contains information associated with the wellsite 104. Moreover, the wellsite database server may store data collected from the various sensors at the wellsite in realtime. Such data may further include downhole data 230 collected from bottomhole assembly (BHA) 220. The wellsite database server 210 may also contain data from a previous wellsite operation. The wellsite database server 210 may further include rock property laboratory data from samples of the subterranean formation. In certain example embodiments, the wellsite database server 210 may further include in situ rock property data taken received during a well operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

In an illustrative embodiment, the IHS may include an analysis system 310 for the wellsite data. The wellsite data may be replicated at one or more remote locations relative to the wellsite. The analysis system may transmit data via network (not shown) and radio frequency transceivers to remote locations.

The network communication may be any combination of wired and wireless communication. In one example, at least a portion of the communication is transferred across the internet using TCP/IP internet protocol. In some embodiments, the network communication may be based on one or more communication protocols (e.g., Hypertext Transfer Protocol (HTTP), HTTP Secured (HTTPS), Application Data Interface (ADI), Well Information Transfer Standard Markup Language (WITSML), etc.). A particular non-volatile machine-readable medium 108 may store data from one or more wellsites and may be stored and retrieved based on various communication protocols. The non-volatile machine-readable media 108 may include disparate data sources (such as ADI, Javi Application Data Interface (JADI), Well Information Transfer Standard Markup Language (WITSML), Log ASCII Standard (LAS), Log Information Standard (LIS), Digital Log Interchange Standard (DLIS), Well Information Transfer Standard (WITS), American Standard Code for Information Interchange (ASCII), OpenWorks, SiesWorks, Petrel, Engineers Data Model (EDM), Real Time Data (RTD), Profibus, Modbus, OLE Process Control (OPC), various RF wireless communication protocols (such as Code Division Multiple Access (CDMA), Global System for Mobile Communications (GSM), etc.), Video/Audio, chat, etc.). While the system 100 shown in FIG. 1 employs a client-server architecture, embodiments are not limited to such an architecture, and could equally well find application in a distributed, or peer-to-peer, architecture system.

FIG. 2 illustrates an information handling system (IHS) 106A, 108A, 112A that may be used for accessing the wellsite database server for use in optimizing drilling operations, according to some embodiments. In the example shown, the IHS 106A, 108A, 112A may include one or more processors. The IHS 106A, 108A, 112A may include a memory unit, processor bus, and an input/output controller hub (ICH). The processor(s), memory unit, and ICH may be coupled to the processor bus. The processor(s, memory unit, and ICH may be coupled to the processor bus. The processor(s) may include any suitable processor architecture. IHS 106A, 108A, 112A may include one or more processors, any of which may execute a set of instructions in accordance with embodiments of the disclosure.

The memory unit may store data and/or instructions, and may include any suitable memory, such as a dynamic random access memory (DRAM). IHS 106A, 108A, 112A may also include hard drives such as IDE/ATA drive(s) and/or other suitable computer readable media storage and retrieval devices. A graphics controller may control the display of information on a display device, according to certain embodiments of the disclosure.

Figure 3:
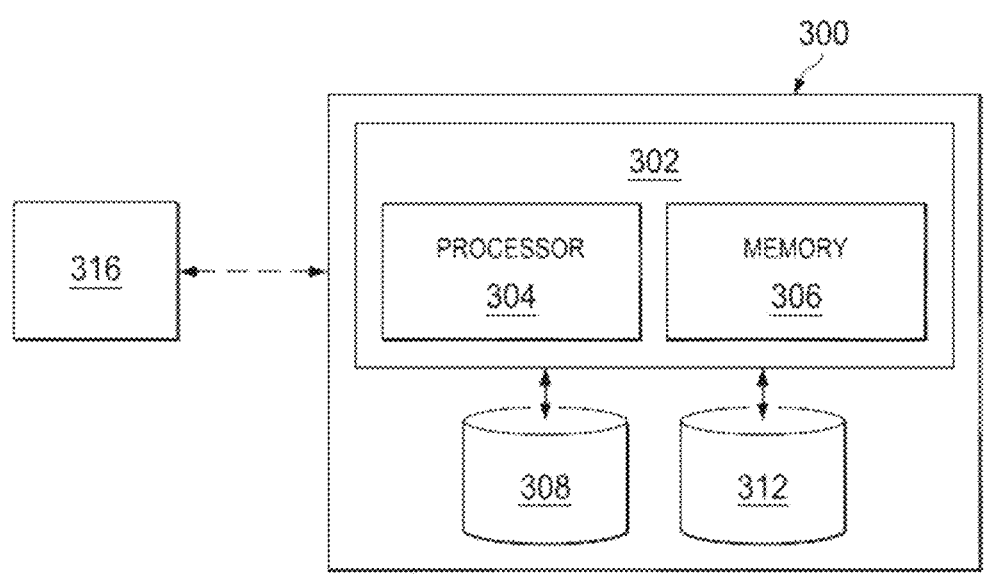
FIG. 3 is a diagram illustrating an example interface within a workflow architecture according to aspects of the present disclosure.

The IHS 106A, 108A, 112A may also implement, as noted above, an analysis system 310 such as shown in FIG. 3 of the present embodiment to control the drilling operations. The analysis system 310 may provide an interface to one or more suitable integrated drive electronics drives, such as a hard disk drive (HDD) or compact disc read only memory (CD ROM) drive, or to suitable universal serial bus (USB) devices through one or more USB ports. In certain embodiments, the analysis system 310 may also provide an interface to a keyboard, a mouse, a CD-ROM drive, and/or one or more suitable devices through one or more firewire ports. A user, operator, or technician at the wellsite may access the analysis system 310 through a user interface 330. For certain embodiments of the present disclosure, the analysis system 310 may also provide a network interface through which analysis system 310 can communicate with other computers and/or devices.

In one embodiment, the analysis system 310 may have access to a wellsite database server 210. In certain embodiments, the connection may be an Ethernet connection via an Ethernet cord. As would be appreciated by those of ordinary skill in the art, with the benefit of this disclosure, analysis system 310 may be connected to the wellsite database server by other suitable connections, such as, for example, wireless, radio, microwave, or satellite communications. Such connections are well known to those of ordinary skill in the art and will therefore not be discussed in detail herein. In one embodiment, the analysis system 310 may use the data in such a manner that the analysis system 310 using software can optimize the drilling operation for the wellsite by generating a new model to use for the drilling operation. The data will be stored in a database with a common architecture, such as, for example, oracle, SQL, or other type of common architecture.

The data that is generated by the sensors at the wellsite are generally known to a person of skill in the art. These and other model data, including model data of previous control for drilling operations to conduct reservoir operations may be stored at the wellsite database server 320. The various models can identify, for example, variables for how such models are optimized for the drilling operation. For example, if the goal of the drilling operation is to minimize drift, the models can include past models used in similar reservoir operations for minimizing drift, while at the same time use the current drilling parameters and sensor information into a fuzzy logic algorithm to generate a model to use to perform the drilling operation. For instance, such parameters may include environmental parameters, downhole parameters, formation evaluation parameters, issues with resistivity or conductivity of the drilling mud and earth formations. Many other parameters may be known to one skill in the art. The model data 340 connected to the analysis system 310 may further include the model data associated with past wellsite operation.

In one embodiment, the software produces data that may be presented to the operation personnel in a variety of visual display presentations such as a display.

In the fields of engineering geology, geotechnical engineering, and civil engineering, soil and sediment layers are often measured and characterized for various properties including material strength. In certain embodiments, the sediment layers are generally numbered sequentially for identification purposes and are often unique to a given investigation site. In certain example embodiments, an engineering sediment profile and map is made of the distribution of the sediment properties within the area of investigation based on the layering.

The embodiments of this disclosure define a local engineering layering profile, which may also be referred to as a localized engineering stratigraphy, for a site of investigation. The embodiments of this disclosure may correlate this layering to geological depositional systems and develop predictive sediment mechanical properties models based on historic depositional and diagenetic conditions or to use forward and backward correlative properties prediction between rock strength data and subsurface stratigraphic data such as gamma ray logs.

Figure 4A:
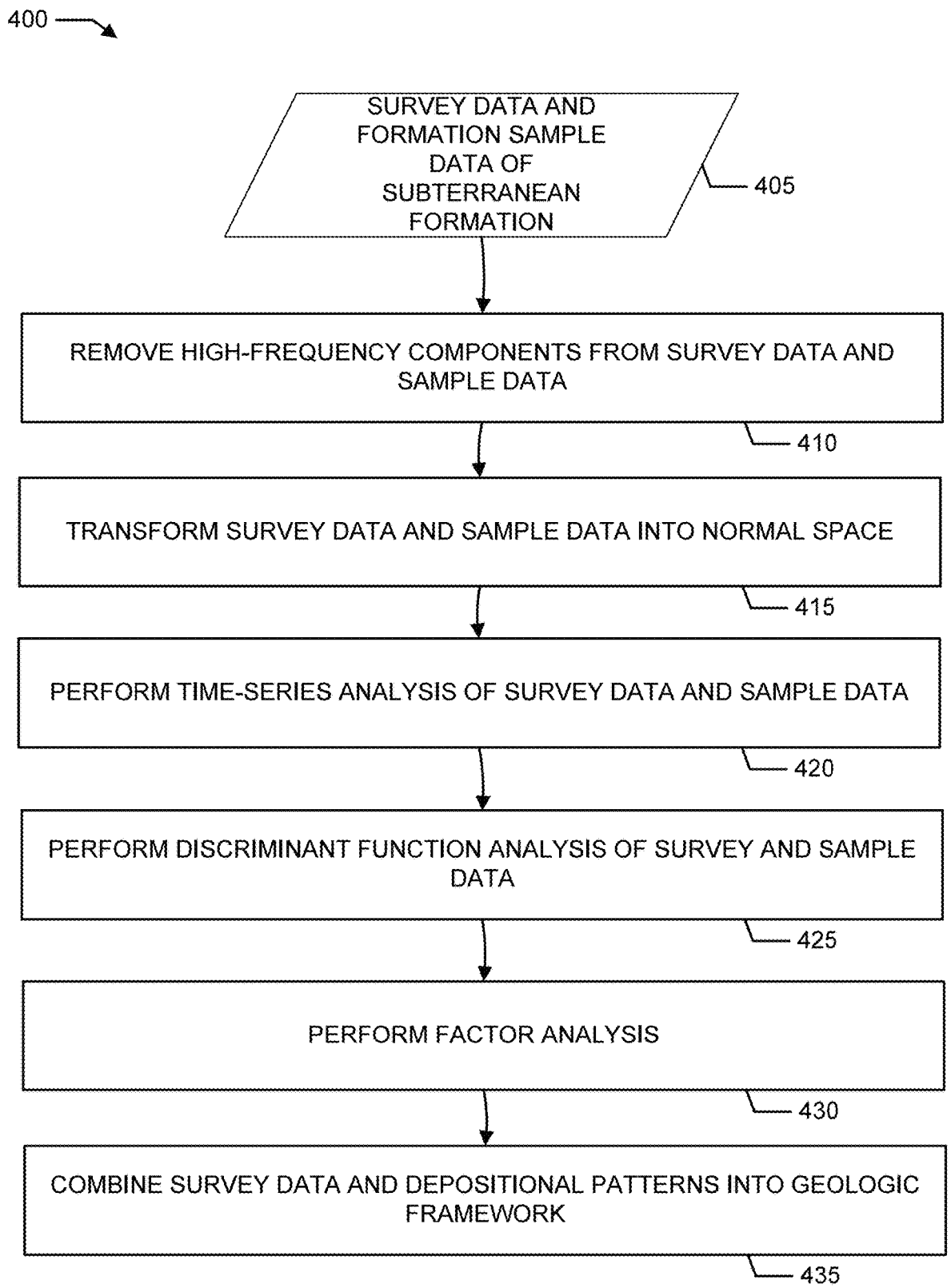
FIGS. 4A and 4B show a flow chart illustrating the exemplary process for implementing an embodiment of the present disclosure.
Figure 4B:
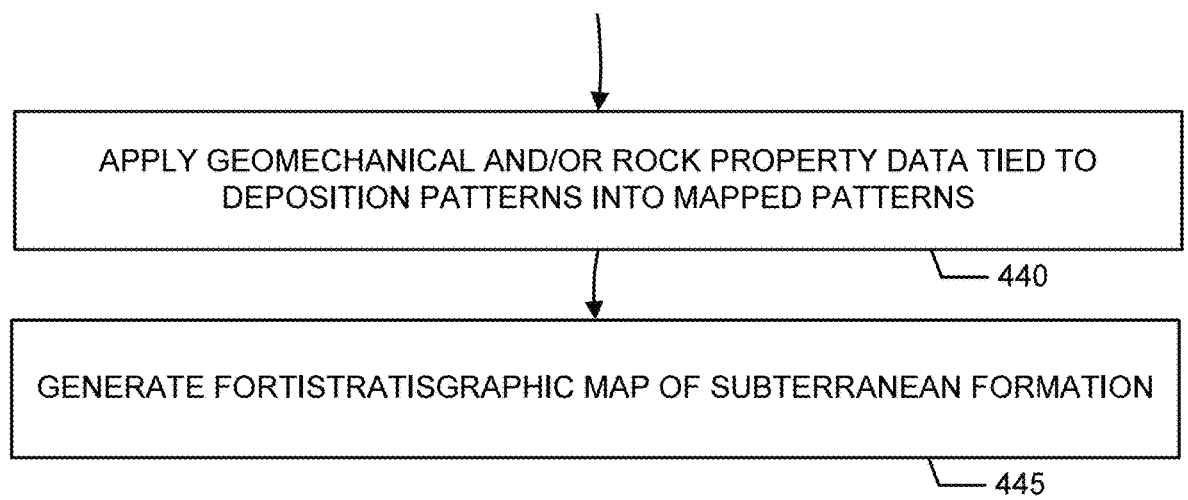

FIGS. 4A and 4B show a flow chart of a method of example embodiment of the present disclosure. In block 405, the system receives sample data and survey data. Example sample data may be based on laboratory analysis of core samples taken from a wellbore at series of depths. Other sample data may be based on data received from a rock-typing tool from a borehole. Other sample data may be based on analysis of cuttings created during drilling a wellbore. For example, the system may perform laser cutting analysis. Other sample data may be based on laser stratigraphy, which, in certain example embodiments, determines at mineral composition. Other example sample data includes lithoscan, which, is based, at least in part on at high magnification to view the structural framework of the rock including, for example, mineral deposition, organic components and fabric. Analysis of the sample data may provide one or more properties of the subterranean formation. Example sample data may include a Yong's modulus (YM) and Poisson's ratio (PR) of the sample. The survey data may be obtained, for example, by wireline logging. In one example embodiment, the survey data may be based on a gamma ray (GR) log. In other example embodiments, other logging tools such as acoustic or SP logging tools provide survey data.

In other example embodiments, borehole image logs and break out analysis can also be used to validate the stress magnitudes and directions. In some cases, it is possible to estimate the second principle stress utilizing borehole image logs and break out analysis. In some embodiments one or more of leak off tests, fracture diagnostic tests, and other injection tests are also used to observe the formation breakdown pressure, observe the closure pressure to, for example, capture information on the least principle stress. In cases where pressure dependent leakoff is observed, it may also be possible to estimate the second principle stress as well by identifying the transition from leakoff into pressure dilated natural fractures to matrix leak off along the created fracture face.

In block 410, the system removes high-frequency components from one or more of the survey data and the sample data. In general, high-frequency components may be more "noisy" and less indicative of the trends under analysis. Other example embodiments may perform other types of filtering of one or more of the survey data and the sample data. In other example embodiments, the system may perform analysis of the high-frequency components of the survey data and the sample data. Example implementations may include an examination values outside of a first standard deviation, a second standard deviation, or a third standard deviation. Example implementations include an examination of values some increment above or below the first and third quartile. The value, in certain embodiments, may act as regional or geologic markers.

In block 415 the system transforms one or more of the survey data and the sample data into normal space. In one example embodiment, the system transforms one or more of the survey data and the sample data into a normal space using a Gaussian transformation. In block 420, the system performs a time series analysis on the survey data and the sample data. The time series analysis may be performed, for example, to examine the validity of the cyclicity of the data.

In block 425, the system may perform a discriminant function analysis of one or more of the survey data or the sample data. In certain example implementations, the discriminant function analysis is performed, for example, to see if the survey data can be predicted from the determine whether the GR can be predicted from the combination of the YM and PR from the sample data or rock analysis.

In block 430, the system performs a factor analysis of the sample data and survey data to determine one or more correlative properties prediction between rock strength data and subsurface stratigraphic data. In certain example embodiments, the factor analysis is, at least in part, a Q-mode factor analysis. In certain example embodiments, the factor analysis includes a principle component and factor analysis. In certain implementations, principle component and factor analysis is a statistical technique that reduces a set of variables to smaller construct of variables by removing redundancy. The analysis identifies a smaller set of variables or components and account for the majority of the variance. When optimized, the smaller set of variable are referred to as factors. In certain example implementations, the factor analysis can be performed to either reduce the number of columns, which correspond to input parameters such as Young's Modulus, Poisson's, ratio, log measurements, or other input parameters. Such an implementation may be referred to as an a' Mode Analysis and may result in a smaller set of unique variables that are independent of one another. In other example implementations, the analysis is performed to reduce the number of rows, which may correspond to stratigraphic layers. This may be referred to as a Q-mode analysis. Such an analysis may be used to identify a set of layer types that are unique and independent of one another. In certain implementations, the Q-Mode analysis is used to identify samples (layers of stratigraphy) that are similar to one another, clusters, or independent event types. The Q-Mode factor analysis may indicate which depth intervals should be grouped together. The groups may identify stratigraphic layers described by a set of variable measurements (including, for example, one or more of GR, PR, and YM) that are similar, thus classifying layers into a small number of clusters or layer-types. In certain example embodiments, the clusters may represent independent event types. In other example embodiments, the factor analysis is, at least in part, an R-mode factor analysis. The R-Mode factor analysis may indicate which input variables are should be grouped together. The groups may identify clusters where variables are similar for example, on a combination of GR, PR, and YM.

In block 435, the system combines deposition patterns derived from the survey data and from the sample data patterns into a geological framework. In certain example embodiments, the system may attempt to match the derived deposition patterns from the survey data and from the sample data to known geological depositional patterns. Thereafter, in block 440, the system applies geomechanical and/or rock property data tied to depositional patterns into the patterns mapped in block 435. The application of geomechanical and/or rock property data tied to depositional patterns enables stress properties to be distributed from one single point at the wellbore where they were measured, across a much larger area. This can then be used, in certain example embodiments, to identify one or more of the drilling mud window and the fracture gradient creating value for both drilling and completion engineers.

In block 445, the system generates a fortistratigraphic map of the subterranean formation. In general, "fortistratigraphy" is a stratigraphic system for spatially classifying rock strength. Rock strength may relate to one or more properties of layers of the subterranean formation, such as porosity, permeability, geochemistry, and fluid composition. In certain example embodiments, fortistratigraphy is considered between well-defined sediment packages in a depositional system bounded by isochrons, unconformities, etc., but may be valuable as locally interpretable. In certain example embodiments, fortistratigraphy is compared to other systematic stratigraphic interpretations. based, at least in part on the first set of subterranean formation data, the second set of subterranean formation data, and the stratigraphic composition of the subterranean formation Modifications, additions, or omissions may be made the method of FIG. 3 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 3 may be omitted.

Figure 5:
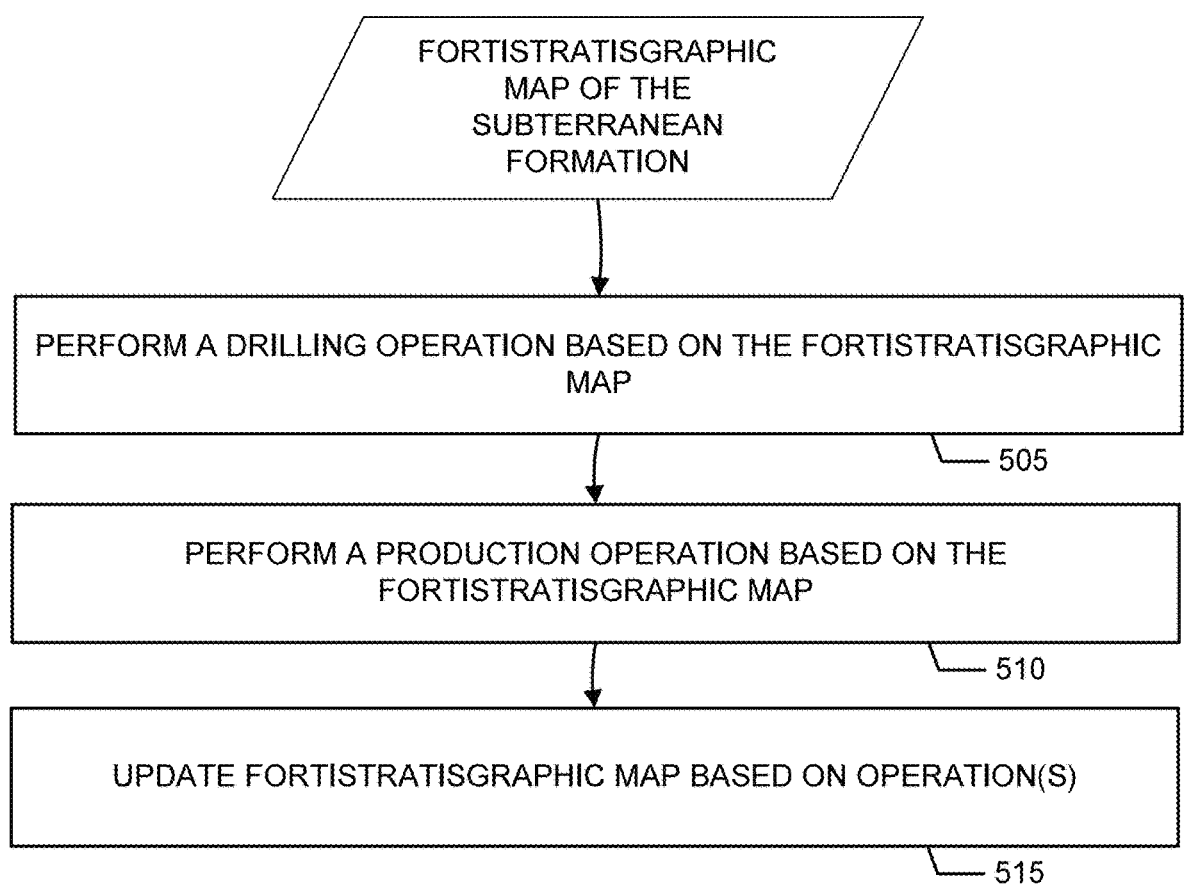
FIG. 5 is a flow chart illustrating an exemplary process for implementing an embodiment of the present disclosure.

FIG. 5 is a flow chart of an example method of the present disclosure showing how the fortistratisgraphic map of the subterranean formation is used by example systems for performing subterranean operations. In block 505, the system performs a drilling operation based on the fortistratisgraphic map of the subterranean formation. In certain example embodiments, the drilling operation is to create a convention well. In other example embodiments, the drilling operation is to create an unconventional well. By way of example, a drilling system may use the fortistratisgraphic map to perform geosteering of a drill bit to a payzone. In certain example embodiments, the system may determine to drill a new well in a location based on the fortistratisgraphic map of the subterranean formation. As part of the drilling operation, the system may optimize mud weight parameters based, at least in part, on the fortistratisgraphic map and the progress of the drilling operation. In other example embodiments, the fortistratisgraphic map may be used for well completion design.

In one example embodiment, the fortistratisgraphic map is used to determine a drilling mud window. The drilling mud window defines the safe operating window for mud weight between the reservoir pore pressure and the fracture gradient. It is desirable to have the mud weight sufficient so that the circulating pressure at the formation is above the reservoir pore pressure to prevent reservoir fluids from entering the wellbore during over balanced drilling operations. If the mud weight exceeds the fracture gradient of the rock, however, the formation can break down resulting in severe losses. The drilling mud window is then established between the pore pressure and fracture gradient.

In one example embodiment, the fortistratisgraphic map is used to determine a fracture gradient and a degree of stress anisotropy. In certain example embodiments, understanding the fracture gradient and degree of stress anisotropy helps the completion engineer to establish the expected treating pressure and the degree of anticipated fracture complexity that could be generated during hydraulic fracturing operations. For perforating it is also possible to determine the desired fluid column to have in the well for either underbalanced, overbalanced or dynamic underbalanced perforating operations.

In block 510, the system may use the fortistratisgraphic map of the subterranean formation to control one or more production operations. Certain production operations may include the introduction of a fluid into the subterranean formation under pressure. In certain example embodiments, the fortistratisgraphic map of the subterranean formation is used to control one or more of the location, direction, pressure, type, and volume of fluid introduced into the formation. In certain example implementations $CO_2$-based fluids may be introduced into the formation. In other example implementations water-based fluid may be introduced into the formation as part of the production process. In certain cases where the fracture gradient or the pore pressure are high or very high, then a completion engineer may have to consider the use of weighted fluids to help lower the hydraulic fracturing treating pressures. On the other hand, where the pore pressure and stresses are low, then nitrogen foamed fluids may be more applicable than CO2 because the nitrogen foamed fluids will have less hydrostatic and more energy for flow-back.

During the drilling operation of block 505, example systems may measure one or more properties of the drilling operation or of the subterranean formation using, for example, measurement while drilling (MWD) systems. The downhole properties may be used to further update or refine the fortistratisgraphic map in block 515. Likewise, during the production operation of block 510, the system may measure one measure one or more properties of the operation or of the subterranean formation, which may be used to update or refine the fortistratisgraphic map in block 515.

The operations will occur in real-time and the data acquisition from the various sensors at the bottomhole assembly 220 or other sensors will be available in realtime at the wellsite database server 210. In one embodiment of optimizing drilling operation, the data is pushed at or near real-time enabling real-time communication and use of the data in optimizing the drilling operation.

FIGS. 6A, 6B, and 6C and FIG. 7-8 are graphical illustrations of the correlations that the system of the present disclosure makes between sample data based on laboratory analysis of formation samples and survey data, for example from a gamma ray survey of a well.

Figure 6A:
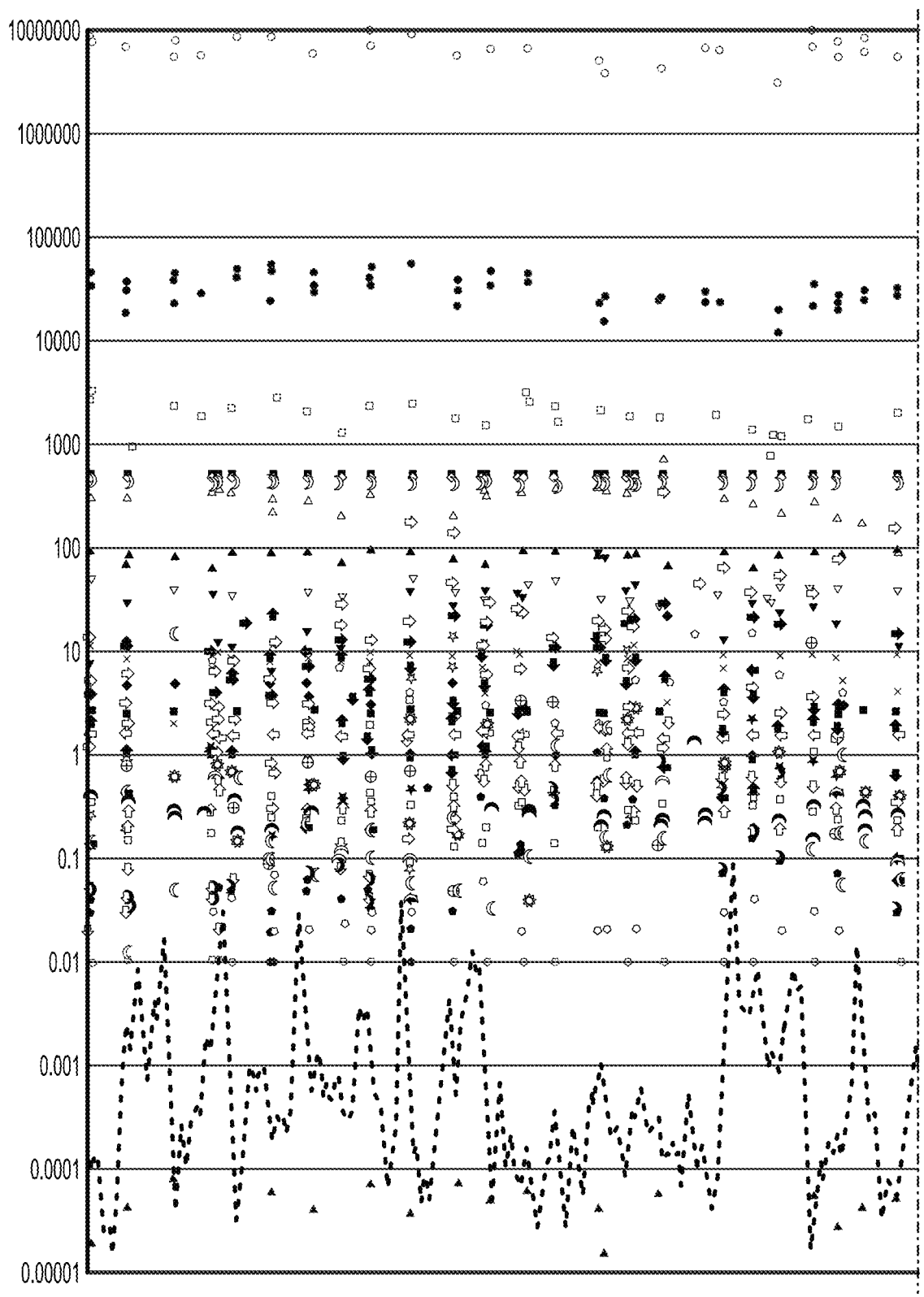
FIGS. 6A, and 6B each depict a section of a graph of laboratory sampling patterns compared with survey patterns from a gamma ray survey.
Figure 6B:
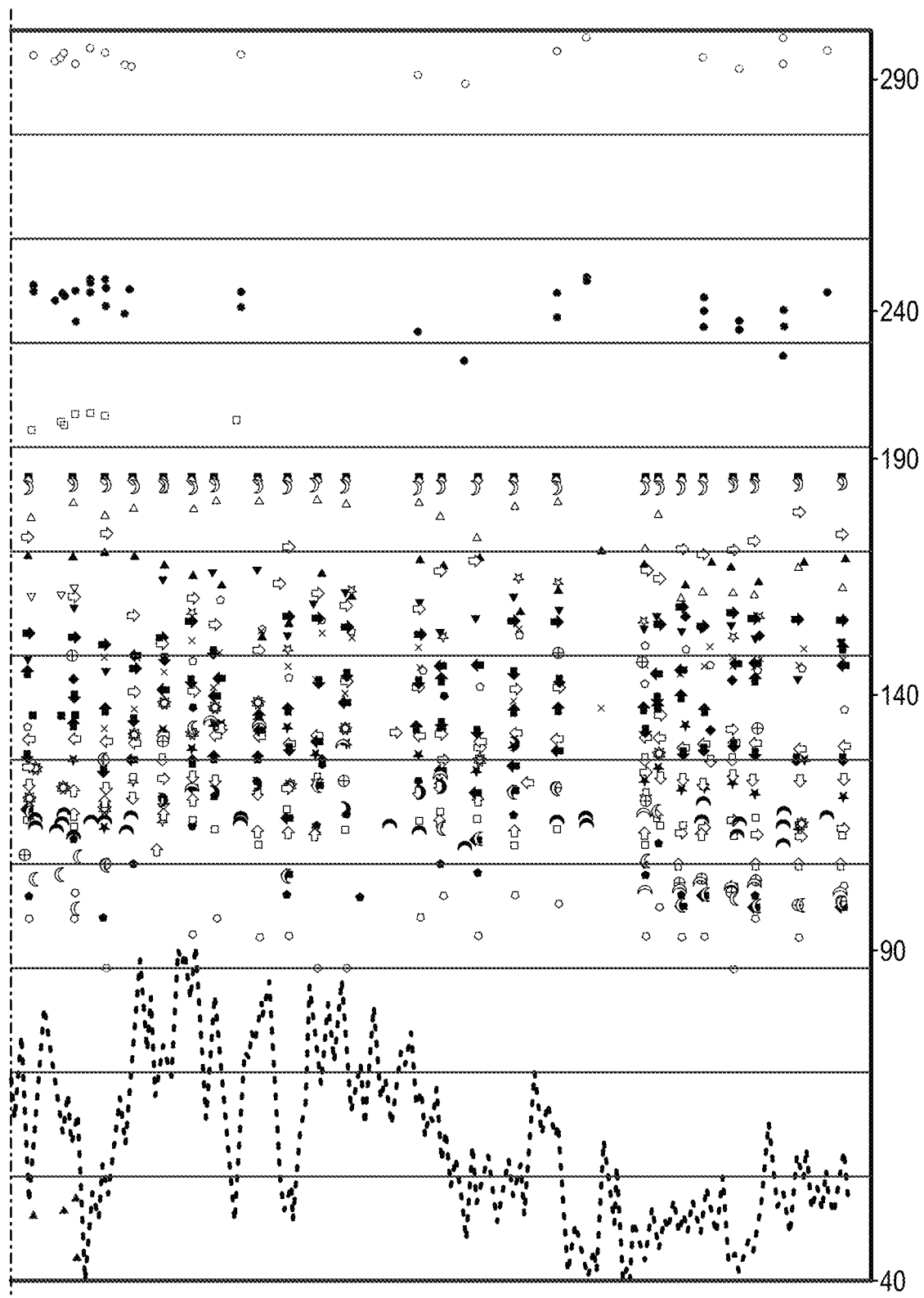

FIGS. 6A, 6B, and 6C shows a graph of laboratory sampling patterns compared with survey patterns from a gamma ray survey. The graph shows a laboratory sampling pattern as it matches with a gamma ray pattern in a typical well. In certain embodiments, the sampling intervals are sufficient to match with the continuously sampled gamma ray curve for geologic depositional patterns. Multiple possible correlations exist between laboratory-derived geomechanical and rock property data.

Figure 7:
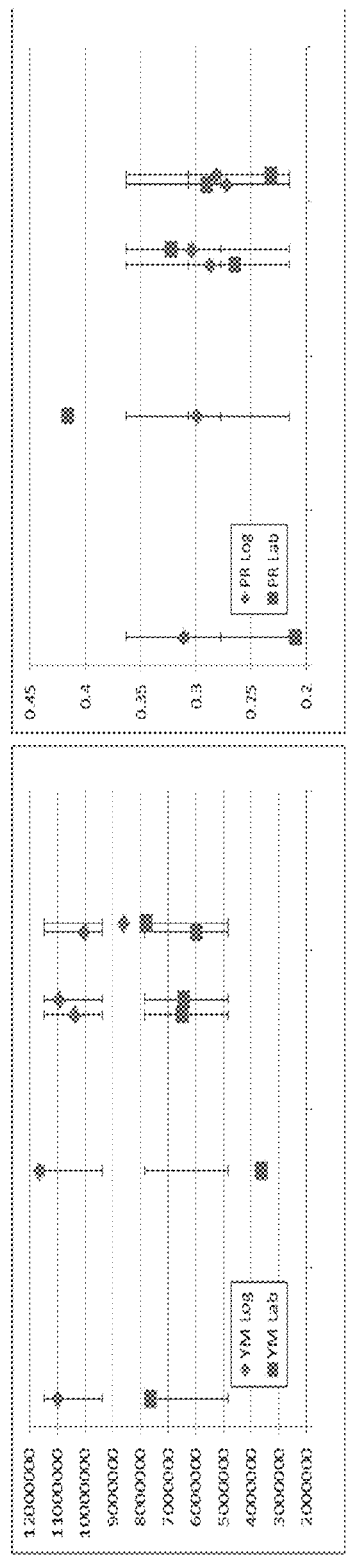
FIG. 7 is a set of graphs of rock properties versus depth based on laboratory sample analysis and log-derived analysis.

FIG. 7 is a set of graphs of rock properties versus depth based on laboratory sample analysis and log-derived analysis. On the left, values of YM versus depth for laboratory analysis of formation samples and YM derived from a GR log are plotted. On the right, values of PR versus depth for laboratory analysis of formation samples and PR derived from a GR log are plotted.

Figure 8:
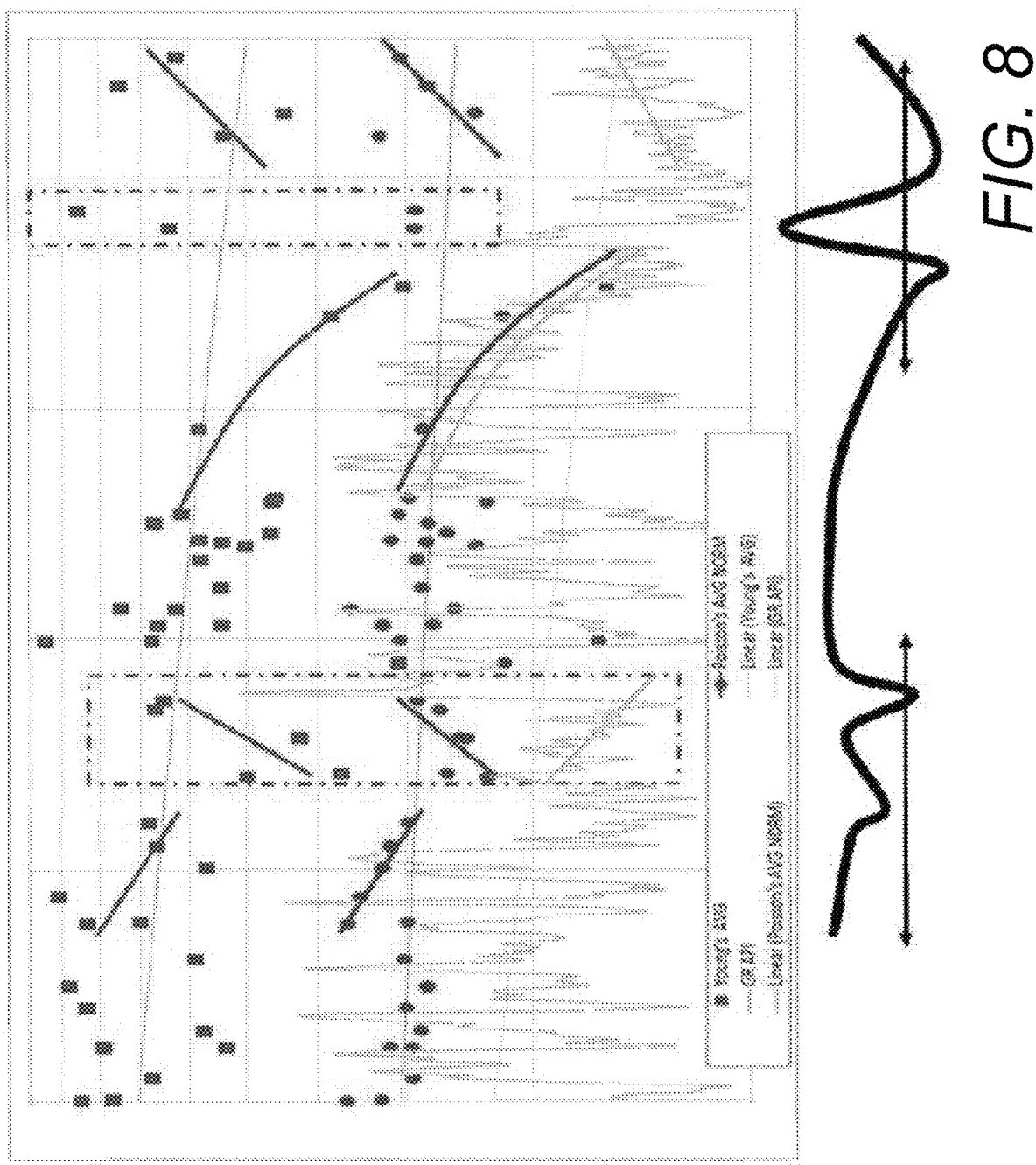
FIG. 8 is a graph of YM and PR from both laboratory sample data and YM and PR derived from GR survey data versus depth.

FIG. 8 is a graph of YM and PR from both laboratory sample data and YM and PR derived from GR survey data versus depth. The two sets of data a similar in trend and are indicative of depositional stratigraphy. These patterns are suggested by standard or known geological log patterns that indicate depositional cycles and sequences. The dark line beneath the graph is an extrapolated trend of a geomechanical pattern. Geological depositional features such as bars, channels, point bars, Crevasse Splays, flood plains levees, or other features may be recognized in some log curves, such as gamma ray logs. In certain example embodiments, by correlating or calibrating YM and PR to the Gamma Ray curve, the system can then use one or more of the YM or PR to determine geological depositional features. In certain example embodiments, the rising and lowering patterns in YM and PR correspond to the rising and lowing patterns in the Gamma Ray curve. A gamma ray curve measures in part grain size. So, going from bottom to top, a rising pattern is referred to as a coarsening upward and might be indicative of a bar. A lowering pattern from bottom to top would indicate fining upward, indicative perhaps of a channel.

As would be appreciated by those of ordinary skill in the art, with the benefit of this disclosure, the methods of the present disclosure may be implemented on virtually any type of information handling system regardless of the platform being used. Moreover, one or more elements of the information handling system may be located at a remote location and connected to the other elements over a network. In a further embodiment, the information handling system may be implemented on a distributed system having a plurality of nodes. Such distributed computing systems are well known to those of ordinary skill in the art and will therefore not be discussed in detail herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for mapping a subterranean formation, comprising:
   receiving, at a processor, a first set of subterranean formation data based, at least in part, on survey data from the subterranean formation;
   receiving, at the processor, sample data;
   transforming at least one of the survey data and the sample to normal space;
   performing a time series analysis on the survey data and the sample data to examine validity of cyclicity of the survey data and the sample data;
   receiving, at the processor, a second set of subterranean formation data based, at least in part, on one or more formation samples from the subterranean formation;
   combining a deposition pattern derived from the survey data and the sample data into a geological framework to identify one or more properties of the subterranean formation;

determining, at the processor, a stratigraphic composition of the subterranean formation; and generating at the processor, for use with a subterranean operation, a fortistratisgraphic map of the subterranean formation based, at least in part on the identified one or more properties of the subterranean formation, the first set of subterranean formation data, the second set of subterranean formation data, and the stratigraphic composition of the subterranean formation.

2. The method of claim 1, wherein the survey data from the subterranean formation is based on a wireline survey of the subterranean formation.

3. The method of claim 1, wherein the survey data from the subterranean formation includes gamma ray (GR) data and wherein the second set of subterranean formation data includes measurements of Poisson's ratio (PR) and Young's modulus (YM) of the samples.

4. The method of claim 3, further comprising:
removing high-frequency components of the survey data.

5. The method of claim 3, further comprising:
performing a Gaussian transformation on one or more of the GR data, PR data, or YM data.

6. The method of claim 3, further comprising:
correlating YM and PR to a GR curve based on the GR data; and
determining one or more geological depositional features based on the correlation.

7. The method of claim 1 wherein generating a map of the geomechanical properties of the subterranean formation further comprises:
performing a principle component and a factor analysis on the first and second sets of subterranean formation data, wherein the principle component and the factor analysis reduces a set of variables to a smaller construct of variables by removing redundancy.

8. The method of claim 7, wherein the factor analysis a Q-Mode factor analysis to determine which depth intervals to group.

9. The method of claim 3, wherein generating a map of the geomechanical properties of the subterranean formation is further based on a library of stratigraphic patterns of other subterranean formation and corresponding geomechanical properties.

10. The method of claim 1, wherein the survey data from the subterranean formation comprises one or more of acoustic log data, rock typing tool data, or well-cuttings analysis data.

11. A system for mapping a subterranean formation, comprising:
at least one processor;
a memory including non-transitory executable instructions that, when executed, cause the at least one processor to:
receive a first set of subterranean formation data based, at least in part, on survey data from the subterranean formation;
receive, at the processor, sample data;
transform at least one of the survey data and the sample to normal space;
perform a time series analysis on the survey data and the sample data to examine validity of cyclicity of the survey data and the sample data;
receive a second set of subterranean formation data based, at least in part, on one or more formation samples from the subterranean formation;

combine a deposition pattern derived from the survey data and the sample data into a geological framework to identify one or more properties of the subterranean formation;
determine a stratigraphic composition of the subterranean formation; and
generate, for use with a subterranean operation, a fortistratisgraphic map of the subterranean formation based, at least in part on the identified one or more properties of the subterranean formation, the first set of subterranean formation data, the second set of subterranean formation data, and the stratigraphic composition of the subterranean formation.

12. The system of claim 11, wherein the survey data from the subterranean formation is based on a wireline survey of the subterranean formation.

13. The system of claim 11, wherein the survey data from the subterranean formation includes gamma ray (GR) data and wherein the second set of subterranean formation data includes measurements of Poisson's ratio (PR) and Young's modulus (YM) of the samples.

14. The system of claim 13, wherein the non-transitory executable instructions that, when executed, further cause the at least one processor to:
remove high-frequency components of the survey data.

15. The system of claim 13, wherein the non-transitory executable instructions that, when executed, further cause the at least one processor to:
perform a Gaussian transformation on one or more of the GR data, PR data, or YM data.

16. The system of claim 13, wherein the non-transitory executable instructions that, when executed, further cause the at least one processor to:
correlate YM and PR to a GR curve based on the GR data; and
determine one or more geological depositional features based on the correlation.

17. The system of claim 11 wherein the non-transitory executable instructions that, when executed, further cause the at least one processor to:
performing a principle component and a factor analysis on the first and second sets of subterranean formation data, wherein the principle component and the factor analysis reduces a set of variables to a smaller construct of variables by removing redundancy.

18. The system of claim 17, wherein the factor analysis a Q-Mode factor analysis to determine which depth intervals to group together.

19. The system of claim 11, wherein the survey data from the subterranean formation comprises one or more of acoustic log data, rock typing tool data, or well-cuttings analysis data.

20. A non-transitory computer-readable medium storing instructions that, when executed by data processing apparatus, perform operations comprising:
receiving a first set of subterranean formation data based, at least in part, on survey data from the subterranean formation;
receiving, at the processor, sample data
transforming at least one of the survey data and the sample to normal space;
performing a time series analysis on the survey data and the sample data to examine validity of cyclicity of the survey data and the sample data;
receiving a second set of subterranean formation data based, at least in part, on one or more formation samples from the subterranean formation;

combining a deposition pattern derived from the survey data and the sample data into a geological framework to identify one or more properties of the subterranean formation;

determining a stratigraphic composition of the subterranean formation; and generating, for use with a subterranean operation, a fortistratisgraphic map of the subterranean formation based, at least in part on the identified one or more properties of the subterranean formation, the first set of subterranean formation data, the second set of subterranean formation data, and the stratigraphic composition of the subterranean formation.

\* \* \* \* \*